*INVENTOR.*
WILLIAM S. STOKES
BY
Hinderstein & Silber
ATTORNEYS

United States Patent Office 3,666,606
Patented May 30, 1972

---

3,666,606
COMPOSITE MEMBRANE AND TILE SYSTEM
William S. Stokes, 941 Placentia Ave., Apt. F,
Fullerton, Calif. 92634
Filed Feb. 18, 1970, Ser. No. 12,182
Int. Cl. B32b 3/16
U.S. Cl. 161—37                                      14 Claims

ABSTRACT OF THE DISCLOSURE

A composite membrane and tile system, comprising an intermediate sheet of fluid impervious, synthetic polymer resin, an oriented rubber elastomeric layer adhesively bonded to the bottom of the sheet, and a layer of tile disposed atop the sheet. A grout, preferably comprising a flexible epoxy resin with an aluminum silicate extender, separates segments of the tile. The tile may be bonded to the sheet by an acrylonitrile and phenolic resin adhesive. The system facilitates installation of tile directly on architectural substrates, the membrane portion preventing fluid leakage to, and isolating the tile from movement of, the substrate.

BACKGROUND OF THE INVENTION

(1) Field of the invention

The present invention relates to a composite membrane and tile system. More particularly, the invention relates to a composite comprising a layer of tile adhesively bonded to a laminated membrane which includes a synthetic polymer sheet and an oriented rubber elastomeric layer bonded to the undersurface of the resin sheet.

(2) Description of the prior art

One of the most eye appealing features which can be incorporated in an architectural structure is a surface of tile. For this reason, architects strive to utilize ceramic or like tile material as a decorative addition to halls, entry ways, pool decks and other building areas. Moreover, the ease with which tile can be cleaned, and the waterproof characteristics of an unbroken tile surface commend the use of tile for floors, walls and work surfaces of bathrooms and kitchens. Builders are particularly anxious to employ tile for such applications, because the combined decorative and functional characteristics of the tile offer almost universal attraction to prospective home buyers.

Despite the advantages of tile, the difficulty and concomitant high cost of installation in the past has limited the use of tile primarily to more expensive homes. To appreciate this problem, one need only consider the manner in which a tile bathroom wall presently is installed. First, a network of wires is strung between the studs and used to support a double-lapped layer of waterproofing paper. On top of the waterproofing paper, a layer of chicken wire or expanded metal cloth is supported by the studs. Cement plaster then is applied over the entire wall, covering and supported by the chicken wire. Next, a scratch coat is applied over the plaster and the composite allowed to set for three to five days. A tile adhesive such as white pozzlin cement then is placed over the plaster and scratch coat, and the tile set in position. Finally, after the tile adhesive has cured for 24 to 48 hours, a grout is installed between the tile segments.

But even if the cost can be tolerated, the problems involved with conventionally installed tile do not stop at installation. In many structures, movement of the architectural substrate occurs due to thermal expansion and contraction, shifting or settling of the structure, earthquake, sonic boom or other reason. Such substrate movement often causes breakage of the tile, cracking of the grout, or disbonding of the tile, thereby permitting leakage of water or other fluid through to the substrate. This leakage in turn may result in deterioration of the substrate, may promote the growth of termites or fungi, and may cause additional cracking or disbonding of the tile. the resultant tile surface is both unattractive and nonfunctional as a fluid barrier, The tendency of tile to crack, break or disbond also has limited severely the type of architectural substrates on which tile presently is installed. Thus, only rarely is a tile surface applied directly over concrete or wood, since these materials are particularly susceptible to expansion, flexing and other movement. A system which facilitates the installation of tile directly on such substrates thus would permit an architect considerably more latitude in the use of tile than is presently available.

These and other shortcomings of the prior art are overcome by using the inventive combined membrane and tile system. The system facilitates rapid, uncomplicated and inexpensive installation of tile over any kind of architectural substrate. The underlying membrane, not the tile itself, serves as the waterproofing member of the composite, thus insuring leakproof integrity of the system even in the unlikely instance of disbonding or cracking of a tile. Moreover, the elastomeric nature of the membrane system isolates the tile from substrate movement or cracking, so that considerable shifting or expansion of the structure can be tolerated without impairing the integrity of the composite membrane and tile system.

SUMMARY OF THE INVENTION

In accordance with the present invention, there is provided a composite membrane and tile system. The system comprises a fluid impervious, flexible membrane portion having an intermediate sheet of synthetic polymer resin and an elastomeric layer of oriented rubber bonded to the underside of the resin sheet. A layer of tile is adhesively bonded to the top surface of the intermediate sheet, and a grout is provided between adjacent tile segments.

In a preferred embodiment, the intermediate sheet comprises a polyvinyl chloride formulation including a polymeric plasticizer, a stabilizer and other additives. A scrim of synthetic resin fiber may be imbedded within the intermediate sheet to improve the mechanical strength thereof.

The elastomeric layer may comprise a polychloroprene (neoprene) rubber together with an accelerator to give vulcanization on curing, and other additives. Alternatively, butyl rubber, various butyl or butadiene rubbers or acrylonitrile may be used. In certain embodiments the rubber exhibits considerable resilience parallel to the plane of the elastomeric layer. The elastomeric layer functions to isolate the intermediate sheet from movement or cracking of the architectural substrate to which the composite membrane and tile system is applied.

The tile layer may comprise ceramic, quarry, mosaic or other type of tile bonded to the intermediate sheet by means of an appropriate adhesive. For example, this adhesive may comprise an acrylonitrile and phenolic mixture in a solvent system containing tetrahydrofuran. The tile grouting may be either flexible or rigid. A preferred flexible grout formulation incorporates an epoxy resin, aluminum silicate (or calcium silicate) as an extender and dry colloidal silica as an antisag agent.

The composite system may be installed conveniently on any type of architectural substrate, including but not limited to concrete and wood surfaces, by adhesively bonding the elastomeric layer of the membrane to the substrate. Subsequently, the tile adhesive is spread in place atop the membrane resin sheet and the tile applied. After a brief tile adhesive curing period, the grout is squeegeed in place.

The membrane portion of the composite, and not the tile itself, functions to prevent water or other fluid from leaking through to the substrate. Thus, the leakproof integrity of the system is maintained even in the unlikely instance that tile or grout should become broken, cracked or disbonded. Moreover, the membrane elastomeric layer effectively isolates the tile from expansion, contraction, shifting, flexing or cracking of the substrate. Accordingly, considerable movement of the substrate can be tolerated without causing breakage or disbonding of the tile layer.

Thus it is an object of the present invention to provide a composite membrane and tile system.

Another object to the present invention is to provide a composite comprising a laminated, fluid impervious membrane and a layer of tile adhesively bonded thereto.

It is another object of the present invention to provide a composite comprising a laminated membrane having an oriented rubber elastomeric layer bonded to the underside of a sheet of fluid impervious, synthetic polymer resin, and a layer of tile disposed atop the synthetic resin sheet.

Still another object of the present invention is to provide a composite membrane and tile system incorporating ceramic, quarry, mosaic or other type of tile bonded by means of an adhesive to a fluid impervious membrane.

It is still another object of the present invention to provide novel grout formulation for use with tile.

A further object of the present invention is to provide a composite for facilitating installation of tile on various types of architectural substrate materials.

Still another object of the present invention is to provide a method and material for facilitating the rapid, inexpensive application of tile to an architectural structure.

BRIEF DESCRIPTION OF THE DRAWINGS

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein.

DESCRIPTION OF THE PREFERRED EMBODIMENTS

Figure 1:
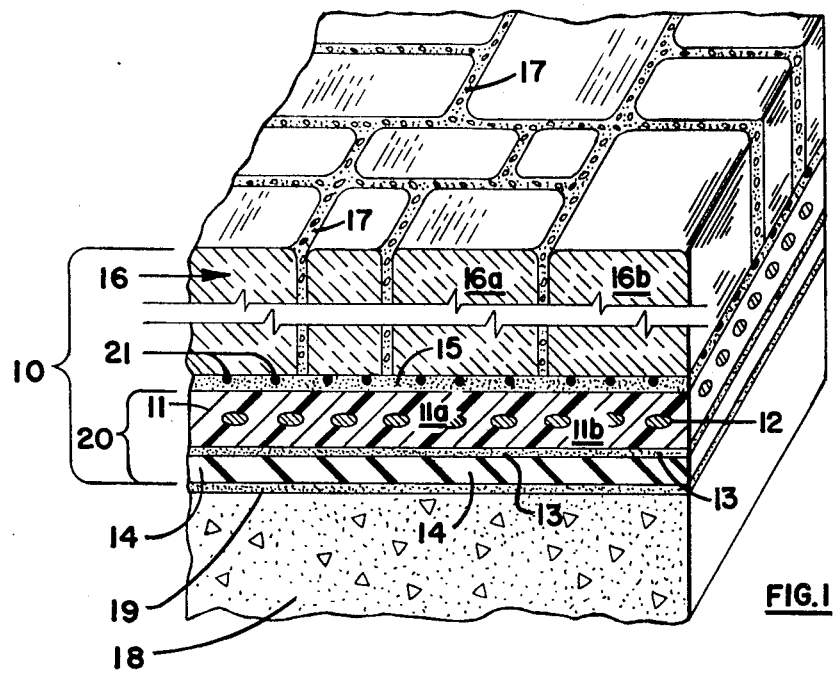
FIG. 1 is an enlarged fragmentary sectional view of a composite membrane and tile system in accordance with the present invention and installed on a concrete substrate.

Referring now to the drawings, and particularly to FIG. 1 thereof, there is shown a small portion of a first embodiment 10 of a composite membrane and tile system in accordance with the present invention. As seen therein, system 10 comprises an intermediate sheet 11 of fluid impervious, flexible, synthetic polymer resin. Completely embedded within sheet 11 is a scrim 12 of synthetic resin fiber. Bonded to the bottom surface of intermediate sheet 11, by means of an adhesive 13, is an elastomeric layer 14 comprising a rubber which may exhibit considerable resilience along the plane of layer 14.

Situated atop intermediate layer 11, and bonded thereto by means of an adhesive 15, is a layer of tile generally designated 16. A grout 17 is disposed between individual tile segments 16a, 16b of layer 16. In FIG. 1, composite system 10 is shown installed on a concrete substrate 18, being attached thereto by means of an adhesive 19. Of course, the invention is not limited to application to concrete substrates, and composite system 10 may be installed on any type of relatively rigid sustrate.

Intermediate sheet 11, scrim 12, adhesive 13 and elastomeric layer 14 (FIG. 1) together comprise a membrane system 20 of the type disclosed in applicant's copending U.S. application, Ser. No. 2,075, filed Jan. 12, 1970, entitled "Membrane System." As noted, FIG. 1 is greatly enlarged, and the actual thickness of membrane system 20 is on the order of from about .015 inch to about .080 inch. Of this membrane thickness, elastomeric layer 14 itself accounts for between about .007 inch and about .070 inch. While having a very small thickness, membrane system 20 typically will have a very large surface area. Thus, membrane system 20 may be manufactured in rolls which are several feet wide by several hundred feet long.

In a typical manufacturing process, intermediate sheet 11 initially may be formed of two independent layers, generally designated 11a and 11b in FIG. 1. Scrim 12, which preferably is coextensive with outer layer 11, then may be sandwiched between layers 11a and 11b and the composite heated to above the melting temperature of the resin used for sheet 11, but below the melting temperature of the material of scrim 12. This operation, which may be accomplished in a heated calender, fusion bonds layers 11a and 11b together, to form the unitary, scrim-embeded intermediate sheet 11 illustrated in FIG. 1.

Elastomeric layer 14 may be applied to intermediate sheet 11 using a conventional 3-roll calender. In such a calender, the upper two rollers rotate in opposite directions and act as a mill into the nip of which is fed the rubber composite used to form elastomeric layer 14. Adhesive 13 is precoated onto bottom surface 15 of sheet 11, and the adhesive coated sheet fed between the lower two rollers of the 3-roll calender. The blanket of rubber which forms around the central roll of the calender then becomes bound to adhesive 13 to compete fabrication of membrane system 20. Such a fabrication technique permits membrane system 20 to be formed in extremely long webs which immediately may be wound into rolls for convenience of handling.

The calendering process by which elastomeric layer 14 is applied also appears to cause anisotropic orientation or crystallization of certain types of rubber used for elastomeric layer 14. While the exact mechanism is unclear, this anisotropic orientation permits layer 14 to exhibit the "slip-sheet" effect described hereinbelow. However, such anisotropic orientation is not required, and the inventive composite membrane and the tile system also envisions the use of non-oriented rubber for elastomeric layer 14.

The rubber forming elastomeric layer 14 may exhibit resilient elongation in the direction of the web of membrane system 20. Thus, depending on the particular formulation employed, the rubber of elastomeric layer 14 may be capable of resilient elongation up to many times its original length when stretched in the direction of the web of membrane system 20 (and in the plane of layer 14). The same rubber also may be capable of resilient elongation to several times its original length in a direction transverse to the web of membrane system 20, but still within the plane of layer 14.

Referring still to FIG. 1, the tile of layer 16 may be of any type conventionally used for decorative or functional architectural purposes. Thus, ceramic, quarry or mosaic tiles all are satisfactory for layer 16. The size and configuration of tile segments 16a, 16b is not at all critical. In a particularly attractive embodiment, layer 16 may comprise tile segments 16a, 16b each having an average thickness on the order of 3/8 inch, of assorted sizes, and preglued to a fiberglass or cloth scrim 21. For ease of installation, tile segments 16a, 16b are not removed from scrim 21, but rather the tile 16 and scrim 21 composite is bonded together onto membrane system 20, scrim 21 becoming substantially embedded in adhesive 15. Alternatively, the tiles of layer 16 may be individually set onto adhesive 15, in which case no scrim 21 would be used or required.

A wide variety of formulations may be used for adhesive 15, the particular formulation employed depending in part on the type of resin embodied in intermediate sheet 11. By way of example only, wthen sheet 11 comprises a polyvinyl chloride composition, adhesive 15 may be prepared from the preferred formulation of Table I below. This "thin set" adhesive cement is self-vulcanizing, waterproof and chemical resistant, and cures rapidly to securely bond tile layer 16 to membrane system 20. Note that all values set forth in Table I are in parts by weight of the solids portion constituents and in part by volume of the solvent system ingredients.

TABLE I

| Ingredient | Preferred amount | Acceptable range |
|---|---|---|
| Solids portion: | | |
| (1) Acrylonitrile | 100 | 60–150 |
| (2) Zinc oxide | 2 | 1–6 |
| (3) Phenolic resin | 60 | 40–80 |
| (4) Stabilizer | 1 | 0.5–2 |
| (5) Process oil | 5 | 2–10 |
| (6) Magnesia | 3 | 2–10 |
| Total | 171 | |
| Solvent system: | | |
| (1) Methyl ethyl ketone | 80 | |
| (2) Tetrahydrofuran | 20 | |

To prepare the adhesive, the acrylonitrile and phenolic resin initially are mill mixed; the other solids portion ingredients then are added and mixed to a smooth consistency. Sufficient solvent system then is used so that approximately 35% solids are present in the adhesive. The adhesive can be made mastic by adding a small amount of a thixotrop, for example, 1% by weight of dry colloidal silica.

As another example, adhesive 15 may be based on vinyl terpolymers combined with additives such as pigments, clay or talc fillers, and small amounts of silica gel. A solvent system based on methyl ethyl ketone and tetrahydrofuran would be appropriate for such vinyl terpolymer adhesive.

Wide latitude is permitted with respect to the materials used for grout 17 between tile segments 16a, 16b. Grout 17 may be either flexible or rigid, a flexible grout being preferred since it is less likely to crack when stressed. However, due to the ability of membrane system 20 to isolate tile layer 16 from movement or cracking of substrate 18, even a non-flexible grout has considerably less likelihood of cracking when incorporated in composite system 10 than if utilized in a conventionally installed tile surface.

A particularly useful formulation for flexible grout is set forth in Table II below. This grout, which is based on epoxy resin and an aluminum silicate (or calcium silicate) extender, can be applied easily with a rubber spatula or squeegee. The formulation cures rapidly to provide a firm but flexible binding between tile segments 16a, 16b. In Table II, all values are in parts by weight of each constituent.

TABLE II

| Ingredient | Preferred amount | Acceptable range |
|---|---|---|
| Part A: | | |
| Epoxy resin | 173 | 110–200 |
| Aluminum silicate (or calcium silicate) | 159 | 75–200 |
| Dry colloidal silica | 4 | 1–8 |
| Toluene | 8 | 5–15 |
| Part B: | | |
| Liquid polysulfide | 129 | 75–150 |
| Aluminum silicate (or calcium silicate) | 91 | 50–120 |
| Talc | 50 | 25–110 |
| 2,4,6-tri(dimethyl aminomethyl)phenol accelerator | 21 | 10–35 |
| Dry colloidal silica | 4 | 1–8 |
| Toluene | 28 | 15–35 |

Parts A and B are prepared separately and mixed together prior to application. The liquid polysulfide then reacts with the epoxy resin, under influence of the accelerator and curing agent, to provide a firm yet flexible binder for the aluminum silicate (or calcium silicate) and talc. The latter materials act as extenders and stabilizers in the grout. The dry colloidal silica functions as an anti-sag agent, which prevents running of the grout when tile layer 16 is installed on a vertical surface.

Other compositions which may be employed as grout 17 includes the epoxy grout sold under the trademark "Nukem 130" by Amercoat Corporation, Brea, Calif.

Preferably, intermediate sheet 11 comprises polyvinyl chloride together with appropriate additives as discussed below. Alternatively, synthetic polymer resins such as chlorosulphonated polyethylene, polypropylene, long chain ethylene propylene, or high molecular weight polyethylene may be used for sheet 11.

It is desirable that appropriate stabilizers be included with the resin to prevent degradation upon exposure of sheet 11 to heat, oxygen and the like. In addition, a plasticizer preferably is employed to enhance the weathering properties and toughness of sheet 11. Other additives, such as epoxy resin may be used to further improve the toughness and abrasion resistance of membrane system 20.

The following Table III indicates an exemplary formulation for intermediate sheet 11 based on polyvinyl chloride. Included in the table are acceptable ranges for each ingredient, as well as a preferred formulation, all set forth in parts by weight of the constituents.

TABLE III

| Ingredient | Preferred amount | Acceptable range |
|---|---|---|
| (1) Vinyl chloride polymer | 59.00 | 40.00–60.00 |
| (2) Polymeric plasticizer | 26.66 | 20.00–35.00 |
| (3) Aluminum silicate | 15.00 | 10.00–30.00 |
| (4) Epoxy resin | 9.16 | 5.00–15.00 |
| (5) Cadmium barium stabilizer | 1.50 | 1.00–3.00 |
| (6) Zinc stabilizer | 0.16 | 0.10–1.50 |
| (7) Organic chelate | 0.33 | 0.20–1.00 |
| (8) Stearic acid | 0.04 | 0.02–0.07 |
| (9) Titanium dioxide | 3.33 | 1.00–5.00 |
| (10) Black iron oxide | 0.19 | 0–2.00 |
| (11) Ultramarine blue | 0.04 | 0–1.00 |
| (12) Yellow iron oxide | 0.02 | 0–0.06 |
| Total | 115.43 | |

The polymeric plasticizer included in the formulation of Table III typically may comprise polypropylene adipate, a polyester of relatively low molecular weight which has good leach resistant properties. This plasticizer, together with the epoxy resin impart extreme toughness to intermediate sheet 11. The aluminum silicate is a reinforcing agent which improves abrasion and tear resistance of the sheet. The titanium dioxide acts as a colorant, and together with the polymeric plasticizer and the high, medium or low molecular weight vinyl chloride polymer give sheet 11 excellent weathering properties. The cadmium barium stabilizer further acts to prevent degradation of sheet 11 upon exposure to heat, oxygen and the like.

Scrim 12 (FIG. 1) preferably comprises nylon, polyester or other synthetic fiber such as that sold under the trademark Dacron. These materials exhibit high tensile strength on tear, but also exhibit sufficient elongation so as not to be ruptured should intermediate layer 11 be stretched or distended. Preferably, scrim 12 is placed near the middle or toward the lower portion of outer sheet 11. It has been found that if scrim 12 is placed too close to the upper surface of outer sheet 11, some "creep" may result in membrane system 20.

Scrim 12 also acts to resist dimensional changes in intermediate sheet 11. Thus while polyvinyl chloride systems typically show long-term shrinkage of from 3 to 10%, the presence of scrim 12 bonded within sheet 11 significantly decreases the effective long-term shrinkage of this sheet. Scrim cloth 12 also prevents the opening of seams or other large ruptures within membrane system 20.

As an alternative material, fiberglass may be used for scrim 12. Fiberglass has almost zero elongation, and thus is preferred for vertical wall application wherein the dimensional stability added by the glass is desirable.

Elastomeric layer 14 preferably is formed of polychloroprene rubber, however other materials such as acrylonitrile, the polymerization product of butadiene and acrylonitrile, styrene-butadiene, polybutadiene, butyl rubber and chloronated butyl rubber also may be employed. A minimum thickness of about .007 inch is desirable for elastomeric layer 14, to provide sufficient "slip-sheet" effect as described below. Such minimum thickness also insures that the rubber will be in continuous contact with the substrate. Further, thicknesses of less than about .007 inch are difficult to calender.

On the other hand, it is desirable that elastomeric layer 14 not exceed a maximum thickness of about .070 inch. If the thickness is considerably greater than this, there is a tendency for membrane system 20 to exhibit "creep" under extreme stress, a problem which could result in rupture or delamination of sheet 11. The preferred thickness range for elastomeric layer 14 is from about .008 inch to about .050 inch.

Table IV below shows acceptable formulations based on polychloroprene for elastomeric layer 14. Acceptable ranges for each ingredient are indicated, together with a preferred formulation indicated in parts by weight of each constituent.

TABLE IV

| Ingredient | Preferred range | Acceptable range |
| --- | --- | --- |
| (1) Polychloroprene | 45.0 | 30.00–60.00 |
| (2) Magnesium oxide | 2.0 | 1.00–4.00 |
| (3) Zinc oxide | 3.0 | 2.00–6.00 |
| (4) Antioxidant | 1.5 | 1.00–6.00 |
| (5) Accelerator | 1.0 | 0.50–2.00 |
| (6) Stearic acid | 0.5 | 0–0.95 |
| (7) Carbon black (or black iron oxide) | 25.0 | 0–35.00 |
| (8) Calcined clay | 22.0 | 15.00–50.00 |
| (9) Calcium carbonate | 16.0 | 10.00–30.00 |
| (10) Process oil | 4.0 | 2.00–15.00 |
| Total | 120.0 | |

Zinc oxide, together with magnesium oxide and an accelerator are included in the formulations of Table IV to produce vulcanization of the rubber. The antioxidant reduces long term degradation of the rubber since oxidation occurs preferentially on the antioxident rather than on the polychloroprene. Carbon black is included to prevent degradation due to ultraviolet light, and, together with the calcined clay, enhances the tensile and tear strength and abrasion resistance of the material.

The preferred polychloroprene rubber formulation set forth in Table IV readily may be calendered onto sheet 11, as described generally hereinabove, to provide an elastomeric layer 14 having excellent "slip-sheet" characteristics. Further, the compound has low "tack," which permits rolls of the membrane system readily to be unwound. The compound also exhibits good resistance to oils and the like, and has good fire retardant properties which permit the inventive membrane system to comply with building and safety code requirements. The membrane system also meets insurance underwriter requirements for self-extinguishing, relatively nonflammable materials.

When elastomeric layer 14 comprises a polychloroprene rubber formulation such as that set forth in Table IV, adhesive 13 (FIG. 1) may comprise a polychloroprene polymer modified with a suitable phenolic resin and other additives. Table V below shows acceptable formulations for the solids portion of such an adhesive, and indicates both acceptable ranges and preferred parts by weight of each ingredient.

TABLE V.—LAMINATING ADHESIVE

| Ingredient | Preferred range | Acceptable range |
| --- | --- | --- |
| (1), Polychloroprene | 100 | 30.00–150.00 |
| (2) Zinc oxide | 5 | 2.00–6.00 |
| (3) Magnesia | 4 | 2.00–5.00 |
| (4) Antioxidant | 2 | 1.00–2.50 |
| (5), Phenolic resin | 50 | 30.00–60.00 |
| (6) Red iron oxide | 4 | 3.00–6.00 |
| (7) Chlorinated rubber | 5 | 2.00–20.00 |
| Total | 170 | |

To prepare the adhesive, the polychloroprene initially is milled thoroughly to break down the polymer. The other ingredients then are added and mixed until a smooth consistency is achieved. The compound then is shredded and added to a suitable solvent system preferably containing tetrahydrofuran which improves adhesion to polyvinyl chloride sheet 11 by its solvating action on the vinyl surface.

An acceptable solvent system for use with the formulation of Table V may comprise 20 parts by weight toluene, 70 parts by weight of methyl ethyl ketone and 10 parts by weight of tetrahydrofuran. Sufficient solvent is used so that approximately 20% to 50% solids is present in the adhesive. With solids concentration of from 15% to 35%, the same adhesive formulation may be used (i.e., as adhesive 19) to apply membrane system 20 to a wooden, concrete or steel substrate.

Figure 2:
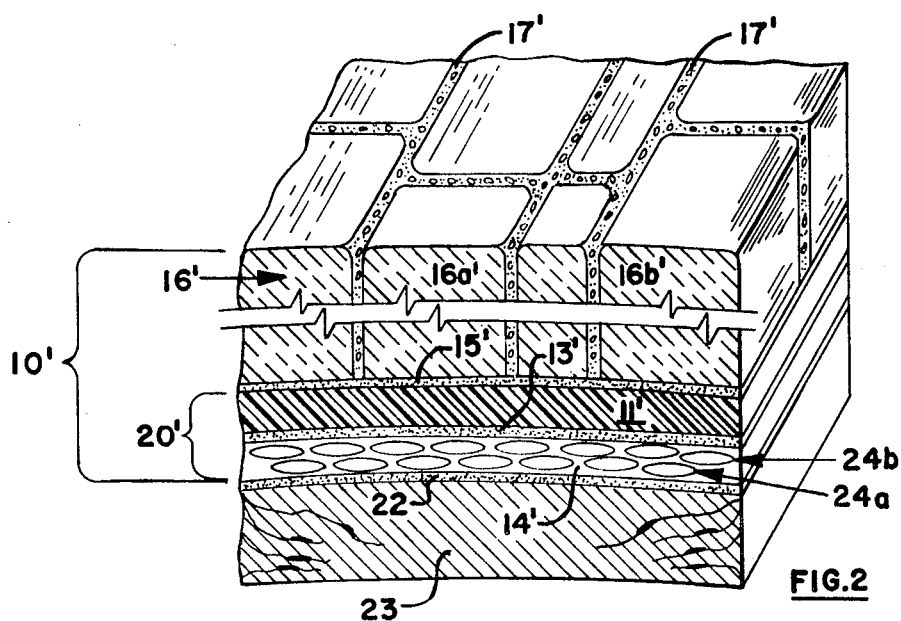
FIG. 2 is an enlarged, fragmentary sectional view of another embodiment of the inventive composite membrane and tile system adhesively bonded to a wooden substrate; this figure illustrates the ability of the system to tolerate flexing or other movement of the substrate.

Another embodiment of the inventive composite membrane and tile system is illustrated in FIG. 2. As shown therein, composite 10' comprises a layer of tile 16' bonded by means of an adhesive 15' to a membrane system 20'. Membrane system 20' itself includes an intermediate layer 11' bonded by means of an adhesive 13' to an elastomeric layer 14'. A grout 17' is disposed between segments 16a', 16b' of layer 16. Each compoment of membrane system 10' corresponds to the unprimed, like numbered element in the embodiment of FIG. 1. Note (FIG. 2) that intermediate sheet 11' does not include an imbedded scrim. Although tile segments 16a, 16b are not shown preglued to a scrim (such as scrim 21 of composite 10), optionally such a scrim may be employed.

In FIG. 2, composite membrane and tile system 10' is bonded by means of an adhesive 22 to a wooden substrate 23. Adhesive 22 may be of the same or different composition as adhesive 19 (FIG. 1) and functions to bond a rubber of the type employed in layer 14' to wooden substrate 23.

The substrate in FIG. 2 is shown as being slightly arcuate. This illustrates the ability of composite system 10' to tolerate considerable flexing of the substrate. For example, when using conventional tile 16' having a thickness of from 1/8 to 3/16 inch and an average size of less than 2 inches square, a substrate 23 flexure of as much as 1/2 inch per one foot of substrate length can be tolerated with no tendency whatever for tile segments 16a, 16b to break or to become disbonded from membrane system 20'. Moreover, when utilizing a flexible grout 17' such as that set forth in Table II hereinabove, there is no tendency for the grout to crack or become loose despite flexure of substrate 23.

In certain embodiments, the rubber employed for elastomeric layer 14 or 14' exhibits a "slip-sheet" effect which may be understood in conjunction with FIG. 2. This "slip-sheet" effect allows the inventive composite membrane and tile system 10 or 10' to tolerate considerable expansion, contraction and/or cracking of the substrate to which the system is applied.

Referring to FIG. 2, the generally oval shaped elements generally designated 24a, 24b schematically represent planes in the apparently anisotropically oriented rubber elastomeric layer 14'. Although two such crystalline planes 24a, 24b are illustrated, it is most likely that considerably more of such planes actually exist.

The planes 24a, 24b of oriented rubber in elastomeric layer 14' exhibit considerable resilience parallel to the web of membrane system 20', while exerting minimal transverse force between adjacent layers. Thus if the coefficient of expansion of wood is greater than that of sheet 11', as substrate 23 thermally expands or contracts the substrate will pull with it the lower plane 24a. Because of the characteristics of elastomeric layer 14', plane 24a can tolerate extreme elongation without exceeding the elastic limit of the rubber.

Moreover, since there is relatively little transverse force exhibited between planes 24a and 24b, expansion of plane 24a causes relatively less expansion of planes 24b. Thus, expansion of substrate 23 causes the various planes in elastomeric layer 14' to expand by relatively decreasing amounts, the expansion of the uppermost plane being much more closely related to expansion of intermediate sheet 11' than to expansion of substrate 23.

Thus it may be seen that sheet 11', and hence tile layer 16', is isolated from movement of substrate 23 by the relative lateral movement (slip) between planes (sheets) 24a, 24b of oriented rubber elastomeric layer 14'. It is this characteristic which herein is called the "slip-sheet" effect. The same effect in elastomeric layer 14 (FIG. 1) isolates intermediate sheet 11, and hence tile layer 16, from movement of concrete substrate 18. Moreover, should substrate 18 or 23 develop a crack or fissure, the "slip-sheet" effect permits elastomeric layer 14 or 14' to bridge the gap, even though the gap size should increase many fold, with minimal transmission of the resultant lateral force to sheet 11 (or 11') and tile layer 16 (or 16').

As noted earlier, elastomeric layer 14 or 14' need not comprise an oriented rubber exhibiting a "slip-sheet" effect; alternatively, unoriented rubber may be used. While such rubber provides sufficient isolation of the tile to compensate for typical substrate expansion, unusual deformation of the substrate may cause creep of the rubber or result in an unlevel or nonuniform tile surface.

The inventive composite membrane and tile system permits rapid, simple and inexpensive installation of tile on any architectural substrate. To accomplish such installation, substrate 18 (or 23) is smoothed out and primed with an adhesive 19 (or 22). Next, membrane system 20 (or 20') is layed out on the adhesive. When surface areas larger than the width of a single web of membrane system 20 (or 20') are to be covered, adjacent webs of the membrane system may be used, possibly connected by lap or butt joints of the type set forth in U.S. Patent No. 3,475,260 to W. S. Stokes.

Next, a tile adhesive 15 (or 15'), possibly in accordance with the formulation of Table I, is spread over intermediate sheet 11 (or 11') in a conventional manner using a notched spreading trowel or bristled brush. Individual tile segments 16a', 16b' or a combination of tiles 16a, 16b preglued to a cloth scrim 21 then are placed in position while the tile adhesive still is wet. The adhesive is allowed to set or cure; when using the adhesive of Table I, the curing time typically is on the order of from 1 to 6 hours.

The freshly placed tile then may be grouted, for example with the formulation set forth in Table II. This grout formulation readily may be applied with a rubber spatula or squeegee to work in the grout between the tile segments. Finally, the tile is washed with water or a solvent such as xylene or toluene to remove excess grout and other deleterious materials.

The external appearance of the resultant tile surface is substantially identical to that of a tile surface installed in a conventional manner. However, unlike conventionally installed tile, the leakproof characteristics of the surface are not provided by the tile and grout, but rather by the underlying membrane. Thus, even in the unlikely event that tile segments 16a, 16b or grout 17 should become cracked, broken or disbonded from membrane system 20, the membrane system itself will prevent leakage of water or other fluid through to the substrate.

Also unlike conventionally installed tile, layer 16 is isolated by elastomeric layer 14 from movement or cracking of the substrate. Thus considerable structural expansion, contraction, shifting and the like can be tolerated without resulting in loss of integrity of tile layer 16. In addition, the membrane system acts as a sound dampener to reduce the noise caused by a person walking over a tile surface.

The weight of the inventive composite membrane and tile system is substantially less than the weight of a conventional cement plaster and tile surface. As a result, no provision generally need be made for increasing the load-bearing capability of joists or other structural members used to support the inventive tile system.

The inventive composite membrane and tile system also may incorporate carpet tile or synthetic turf (not shown) in place of the ceramic or like tile layer 16 or 16' shown in the figures. Carpet tile typically comprises squares of nylon, polypropylene or like synthetic polymer, formed in threads and woven or bonded into a carpet-like composition. Such carpet tile may be bonded to membrane system 20 or 20' by means of the adhesive formulations set forth in Table V above, or by other appropriate adhesives well known to those skilled in the art. Similarly, synthetic turf, typically incorporating artificial grass blades made of polypropylene or like material, may be adhesively bonded atop membrane system 20 or 20'.

A significant advantage is gained by employing the composite membrane and carpet tile or synthetic turf system, as opposed to applying such carpet tile or turf directly to an architectural substrate. Specifically, carpet tile or synthetic turf by itself is not completely fluid impervious. By employing the composite system, the membrane portion provides a completely leak-proof barrier preventing water or other fluid which may seep through the carpet tile or turf from leaking through to the substrate.

While the invention has been described with respect to the preferred physical embodiments constructed in accordance therewith, it will be apparent to those skilled in the art that various modifications and improvements may be made without departing from the scope and spirit of the invention.

I claim:

1. A composite mebrane and tile system comprising:
   a fluid impervious, synthetic polymer sheet having top and bottom surfaces,
   a rubber elastomeric layer bonded to said bottom surface of said sheet,
   a layer of tile adhesively bonded to said top surface of said sheet, and
   wherein said rubber is selected from the group consisting of polychloroprene, acrylonitrile, styrene-butadiene, polybutadiene, the polymerization product of butadiene and acrylonitrile, butyl rubber and chloronated butyl rubber.

2. A composite membrane and tile system as defined in claim 1 further comprising a synthetic fiber scrim imbedded completely within said sheet.

3. A composite membrane and tile system as defined in claim 2 wherein said synthetic fiber scrim is selected from the group consisting of nylon, polyester and fiberglass.

4. A composite membrane and tile system as defined in claim 1 wherein said synthetic polymer is selected from the group consisting of polyvinyl chloride, chlorosulphonated polyethylene, polypropylene, long chain ethylene propylene and high molecular weight polyethylene.

5. A composite membrane and tile system as defined in claim 4 wherein said elastomeric layer has a thickness of between about .007 and about .070 inch, and wherein the combined thickness of said sheet and said elastomeric layer is between about .015 inch and about .080 inch.

6. A composite membrane and tile system as defined in claim 5 wherein said tile is bonded to said sheet by means of an adhesive comprising acrylonitrile and phenolic resin in a solvent system containing tetrahydrofuran.

7. A composite membrane and tile system as defined in claim 6 further comprising a grout between segments of said tile layer.

8. A composite membrane and tile system as defined in claim 7 wherein said grout comprises an epoxy polymer and an extender.

9. A composite membrane and tile system as defined in claim 6 wherein said tile is preglued to a second scrim, said second scrim being embedded in said adhesive.

10. An architectural composite comprising:
an architectural substrate,
a membrane adhesively bonded to said substrate, said membrane comprising an elastomeric layer of rubber and a synthetic polymer sheet adhesively bonded to said elastomeric layer, and
a layer of tile adhesively bonded to said sheet.

11. A composite as defined in claim 10 wherein said rubber is selected from the group consisting of polychloroprene, acrylonitrile, styrene-butadiene, polybutadiene, the polymerization product of butadiene and acrylonitrile, butyl rubber and chloronated butyl rubber, and wherein said synthetic polymer is selected from the group consisting of polyvinyl chloride, chlorosulphonated polyethylene, polypropylene, long chain ethylene propylene and high molecular weight polyethylene.

12. A composite as defined in claim 11 further comprising a grout between segments of said tile.

13. A composite as defined in claim 12 wherein said tile layer is bonded to said sheet by means of an adhesive comprising acrylonitrile and phenolic resin in a solvent system containing tetrahydrofuran.

14. A composite as defined in claim 13 wherein said grout comprises an epoxy resin and an extender selected from the class consisting of aluminum silicate and calcium silicate.

References Cited

UNITED STATES PATENTS

| | | | |
|---|---|---|---|
| 2,168,949 | 8/1939 | Bentz et al. | 52—390 |
| 3,335,048 | 8/1967 | Morain | 52—390 X |
| 3,239,981 | 3/1966 | Fitzgerald | 52—309 |
| 2,887,867 | 5/1959 | Burchenal et al. | 161—39 X |
| 2,658,053 | 11/1953 | Signer et al. | 161—251 X |

PHILIP DIER, Primary Examiner

U.S. Cl. X.R.

52—309, 390; 161—40, 253, 89